March 17, 1925.
R. W. SCHROEDER
1,530,061
COMBINED FLOW METER AND SPEEDOMETER
Filed April 30, 1921   2 Sheets-Sheet 1
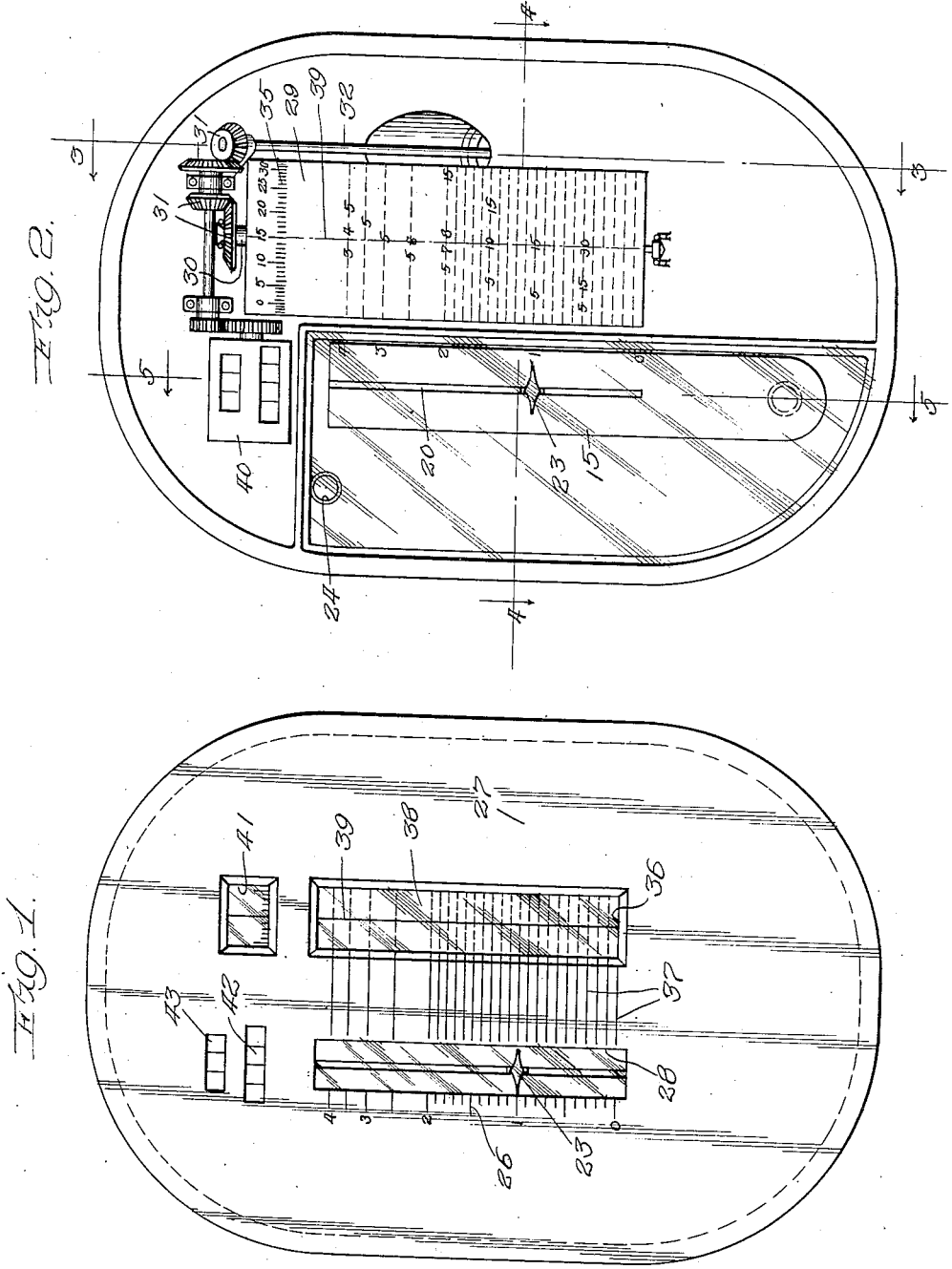

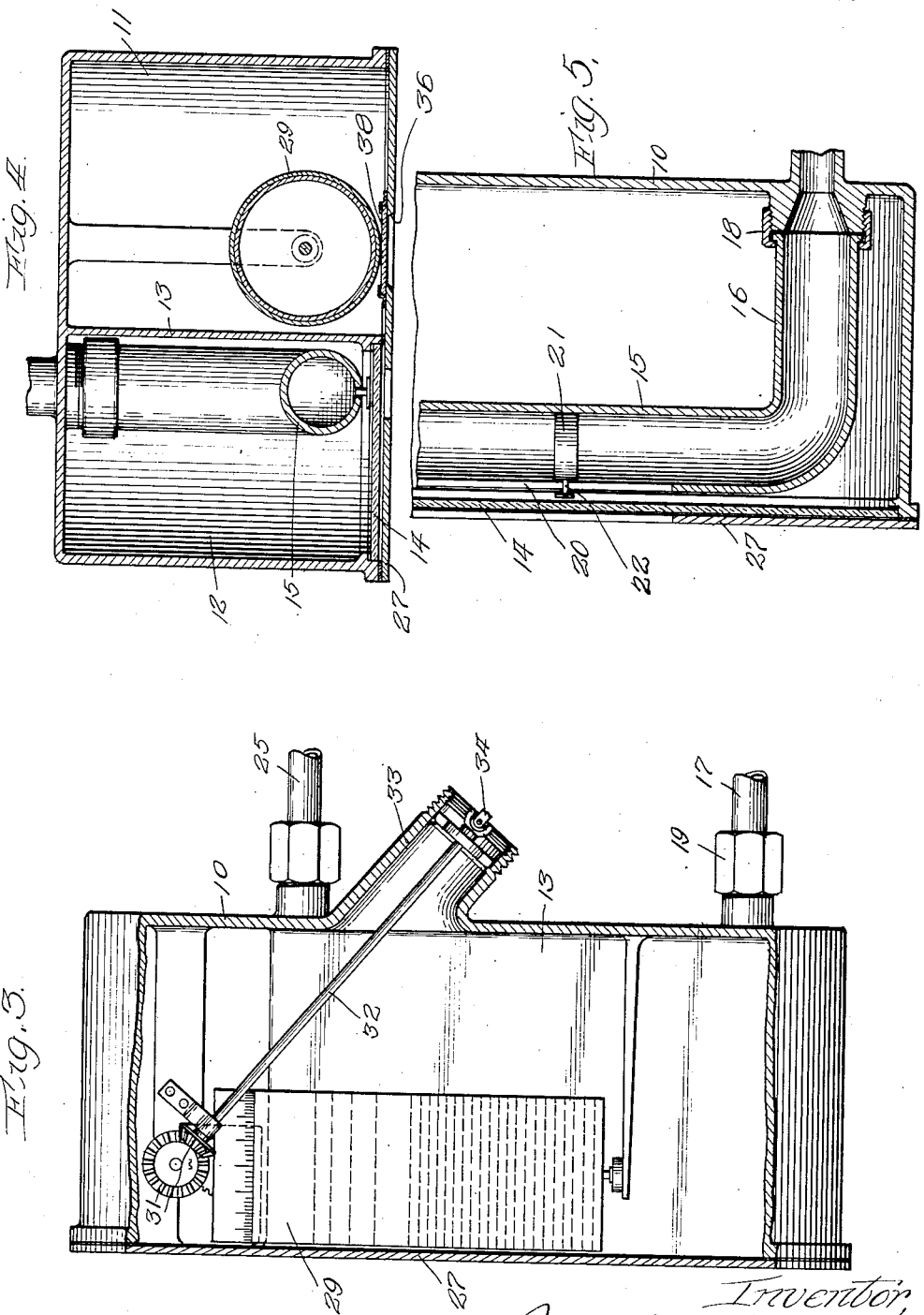

Patented Mar. 17, 1925.

1,530,061

UNITED STATES PATENT OFFICE.

RUDOLPH WILLIAM SCHROEDER, OF CHICAGO, ILLINOIS.

COMBINED FLOW METER AND SPEEDOMETER.

Application filed April 30, 1921. Serial No. 465,831.

*To all whom it may concern:*

Be it known that I, RUDOLPH W. SCHROEDER, a citizen of the United States, residing at Chicago, in the county of Cook and State of Illinois, have invented certain new and useful Improvements in Combined Flow Meters and Speedometers, of which the following is a specification.

This invention relates to instruments for measuring quantities of which the rate of flow of a fluid is one factor and which quantities depend upon another factor, such as the speed of a vehicle or the rate at which work is done by a motor.

In one embodiment of the invention the instrument may indicate, for example, the miles per gallon of a motor vehicle at any particular instant. One object of the invention therefore is to provide an instrument which will indicate directly mileage per unit of motor fuel consumed. The instrument may, of course, be applied to motors for driving loads other than motor vehicles, and many applications of the invention will occur to those skilled in the art.

The invention also has for its object the provision of an indicating instrument of the class named which shall be of improved construction and operation.

The invention is exemplified in the combination and arrangement of parts shown in the accompanying drawings and described in the following specification, and it is more particularly pointed out in the appended claims.

In the drawings—

Fig. 1 is a front elevation of an instrument showing one embodiment of the present invention;

Fig. 2 is a view similar to Fig. 1, but having the front cover plate removed to disclose the interior of the instrument;

Fig. 3 is a vertical section substantially on line 3—3 of Fig. 2;

Fig. 4 is a horizontal section on line 4—4 of Fig. 2; and

Fig. 5 is a fragmentary vertical section on line 5—5 of Fig. 2.

The embodiments shown in the drawings comprise a casing 10 divided into two chambers 11 and 12 by a partition wall 13. The front of chamber 12 is made liquid-tight by a cover plate 14 of glass or other transparent material. Within the chamber 12 is a vertically arranged tube 15, the lower end of which is bent backwardly, as shown at 16, and is connected with a pipe line 17 by means of couplings 18 and 19. The tube 15 is open at its upper end and is provided with a vertically extending slot 20 in the front face thereof, as shown in Figs. 2 and 5. A piston 21 is mounted to slide freely in the tube 15 and carries a pin 22 projecting through the slot 20, the outer end of the pin 22 having a pointer 23 secured thereto. The chamber 12 is provided with a discharge opening 24 which communicates with a pipe line 25.

The pipe line 17 is connected with a source of fluid, the rate of flow of which is to be measured, and the fluid entering through the pipe 17 passes upwardly through the tube 15 and is discharged from the tube through the slot 20 below the piston 21. As the rate of flow varies the height of the piston 21 in the tube 15 will change and the pointer 23 will indicate the rate of flow of fluid. A scale 26 may be placed on the front cover plate 27 adjacent an opening 28 through which the pointer 23 is visible. The scale 26 may be calibrated to indicate directly the rate of flow in gallons per hour or other suitable units. During the operation of the instrument the chamber 12 will be filled with the fluid passing through the instrument. One method of connecting a similar instrument with the fuel supply line of an automobile is shown in my prior application, Serial No. 445,503, filed February 16, 1921. The particular manner of connecting the instrument with the fluid circuit is, however, no part of the present invention.

In the chamber 11 there is mounted a speedometer which may be of any well-known and approved construction. The speedometer illustrated is of the air friction type provided with a rotary drum 29 operated by a shaft 30 connected by gearing 31 with a shaft 32 which communicates through a connecting tube 33 with the speedometer shaft 34. The drum 29 is provided with the usual scale 35 for indicating miles per hour, but the drum is elongated downwardly so that it extends adjacent the tube 15 and an elongated opening 36 is provided in the cover plate 27 to permit the drum 29 to be seen from the front of the instrument. A series of lines 37 extend across the space from the opening 28 to the opening 36, as shown in Fig. 1, the lines corresponding to the graduations on the scale 26. The open ing 36 is provided with a glass cover 38 having a vertically extending line 39 indicating the reading position for the characters on the drum 29. It will be apparent that during the operation of the vehicle to which the instrument is connected the pointer 23 will indicate the consumption of fuel of the engine in gallons per hour, and the scale readings 35 will indicate the speed of the vehicle in miles per hour.

If $a$ represents the reading on scale 26, that is the gallons per hour, and $b$ represents the reading on scale 35, that is miles per hour, then $b$ divided by $a$ will be the miles per gallon, which we may call $c$. The equation of the instrument will then be $$c = \frac{b}{a}.$$

It will be apparent that the lower portion of the drum 29 may be provided with figures indicating the value of $c$ for the various values of $a$ and $b$, and the numerals representing the value of $c$ may be placed on the drum 29 at the intersection of lines leading from the corresponding values $a$ and $b$ on the scales 26 and 35. For instance, as shown in Fig. 1, if the reading of the pointer 23 indicates one gallon per hour and the reading of the speedometer indicates 15 miles per hour, then the miles per gallon will be 15 and the numeral 15 may be placed on the drum 29 directly below the numeral 15 on the scale 35 and at a height on the drum corresponding to the numeral 1 on the scale 26. Now whenever the vehicle is traveling at the rate of 15 miles per hour and the consumption of fuel is at the rate of one gallon per hour, the numeral 15 will assume a position opposite the indicator 23 and back of the line 39 so that the operator may glance at the drum 29 and see that the number opposite the pointer 23 behind the line 39 is 15 and immediately knows that the vehicle is making 15 miles per gallon of fuel consumed. In a like manner the various other characters for the drum 29 may be computed and located. For instance, the numeral on the drum 29 directly below the scale reading indicating 15 miles per hour and opposite the flow meter reading indicating ½ gallon per hour would be 30, that is, 15 divided by ½. The number opposite 1½ gallons per hour would be 10 on the same vertical line. The number opposite two gallons per hour would be 7½. The number opposite 2½ gallons per hour would be 6. The position of the numbers 5 and 15 on the drum 29 have been approximately indicated in Fig. 2, and also the position of the numbers for various rates of flow for 15 miles per hour. It will be apparent that various horizontal lines on the drum 29 may be provided with whole numbers properly positioned, and that the space between the whole numbers may be divided into tenths so that miles per gallon and fractions thereof may be read for the various heights of the pointer 23.

The usual odometer 40 may be provided for indicating the total mileage and openings 41, 42 and 43 in the front plate 27 will permit the speedometer and odometer readings to be seen. When the instrument is used in connection with an automobile it will preferably be mounted on the dashboard in position to be readily seen by the driver, and it may also be connected with an aeroplane in which the air speed indicator device may be used for operating the drum 29, and in a similar manner in use with a motor boat the water speed indicator device may be employed for operating the speedometer portion of the instrument.

I claim:—

1. A device for indicating the efficiency of operation of a motor comprising an instrument having a plurality of differently graduated scales, means cooperating with the various ones of said scales for indicating readings on said scales, and means for selectively indicating different ones of said scales to be considered, one of said indicating means being controlled by the rate of work done by said motor and the other of said indicating means being controlled by the rate of fuel consumption of said motor.

2. In combination, a speedometer for indicating the speed of a motor, a flow meter for indicating the rate of fuel consumption of said motor, an indicator card having a plurality of sets of numbers thereon representing amounts of movement of said motor per unit of fuel consumption, and means for designating the particular set of numbers and the particular number of said set to give the reading on said card corresponding to the readings of said speedometer and flow meter at any particular instant.

3. The combination with a speedometer, of a card moved thereby in one direction, a flow meter having an indicator movable adjacent said card transversely to the direction of movement thereof, and numbers on said card for indicating a function of the readings of said speedometer and flow meter at any particular instant.

4. The combination with a speedometer having a rotary drum, of a flow meter having an indicator arranged to move longitudinally of said drum, numbers on the face of said drum representing units of motion per units of flow of fluid, said numbers being arranged on said drum so that the number coresponding to particular readings of said flow meter and speedometer will be positioned at the intersection of lines passing through said flow meter and speedometer indicators for any particular readings of said flow meter and speedometer.

5. The combination with a speedometer, of a drum operated thereby and having graduated scales distributed longitudinally thereof, and a flow meter positioned adjacent said drum and arranged to indicate different ones of said scales corresponding to different readings of said flow meter.

6. The combination with a speedometer having an indicator drum thereon, of a scale on said drum for indicating miles per hour, additional scales on said drum for indicating miles per gallon for different rates of fuel consumption, and a flow meter arranged to indicate the particular one of said last-mentioned scales corresponding to the rate of flow indicated by said flow meter at any particular instant.

7. The combination with a speedometer having a movable card for indicating miles per hour, a plurality of graduated scales on said card for indicating miles per gallon corresponding to the reading of said speedometer in miles per hour, and a flow meter having an indicator for designating a particular scale corresponding to the rate of flow of fluid in said flow meter at any particular instant.

8. The combination with a speedometer having a rotary drum and a scale thereon for indicating miles per hour, of additional scales on said drum for indicating miles per gallon, a flow meter positioned adjacent said drum and having an indicator arranged to move longitudinally of said drum, said indicator being positioned relative to said drum so as to indicate a particular scale on said drum corresponding to the rate of flow of fluid through said flow meter at any particular instant, and means for designating the reading of said last-mentioned scales corresponding to the readings of said speedometer and flow meter at that instant.

In testimony whereof I have signed my name to this specification on this 21st day of April, A. D. 1921.

RUDOLPH WILLIAM SCHROEDER.